United States Patent [19]
Casey

[11] Patent Number: 5,570,250
[45] Date of Patent: Oct. 29, 1996

[54] DISK DRIVE HEAD DISK ASSEMBLY ACTUATOR MOUNT MECHANISM

[75] Inventor: Shawn E. Casey, San Jose, Calif.

[73] Assignee: Western Digital Corporation, Irvine, Calif.

[21] Appl. No.: 332,957

[22] Filed: Nov. 1, 1994

Related U.S. Application Data

[62] Division of Ser. No. 89,705, Jul. 9, 1993, Pat. No. 5,455,728, which is a division of Ser. No. 802,347, Dec. 4, 1991, Pat. No. 5,270,887.

[51] Int. Cl.⁶ ............................................. G11B 5/54
[52] U.S. Cl. ............................................. 360/106; 360/105
[58] Field of Search ........................ 360/97.01–98.01, 360/105–108

[56] References Cited

U.S. PATENT DOCUMENTS

| | | | |
|---|---|---|---|
| 3,912,278 | 10/1975 | Teutsch | 369/75.1 |
| 4,896,231 | 1/1990 | Hoppe | 360/97.02 |
| 4,933,785 | 6/1990 | Morehouse et al. | 360/105 |
| 4,947,274 | 8/1990 | Casey et al. | 360/105 |
| 4,979,062 | 12/1990 | Stefansky et al. | 360/97.02 |
| 4,999,724 | 3/1991 | McAllister et al. | 360/97.03 |
| 5,003,422 | 3/1991 | Sun et al. | 360/106 |
| 5,021,905 | 6/1991 | Sleger | 360/97.02 |
| 5,025,335 | 6/1991 | Stefansky | 360/97.01 |
| 5,025,336 | 6/1991 | Morehouse et al. | 360/97.02 |
| 5,030,260 | 7/1991 | Beck et al. | 360/97.02 |
| 5,034,837 | 7/1991 | Schmitz | 360/106 |
| 5,060,095 | 10/1991 | Rigotti et al. | 360/98.01 |
| 5,081,552 | 1/1992 | Glaser et al. | 360/98.01 |
| 5,095,396 | 3/1992 | Putnam et al. | 360/108 |
| 5,103,359 | 4/1992 | Marazzo | 360/108 |
| 5,121,273 | 6/1992 | Slezak | 360/108 |
| 5,150,267 | 9/1992 | Reinisch | 360/97.02 |
| 5,161,077 | 11/1992 | Jabbari | 360/106 |
| 5,214,549 | 5/1993 | Baker et al. | 360/97.01 |
| 5,270,887 | 12/1993 | Edwards et al. | 360/97.03 |
| 5,305,169 | 4/1994 | Anderson et al. | 360/106 |

*Primary Examiner*—Jefferson Evans
*Attorney, Agent, or Firm*—Leo J. Young; James A. Ward

[57] ABSTRACT

A disk drive head disk assembly having a compact configuration includes an actuator assembly with an E-block mounted to a base plate through a three point mounting system. The second ridges in a generally cylindrical opening and includes means for forcing a mounting post against the first and second ridges. The E-block has a flex cable mounting surface and wedge: shape extension adapted to receive a portion of said flex cable forming an oblique angle with the flex cable mounting surface. A flex circuit is attached to the base plate and includes a ribbon-like flex cable and an L-shaped member adapted to receive the flex cable with snap-on clamps adapted for mounting the flex cable to the E-block.

5 Claims, 9 Drawing Sheets

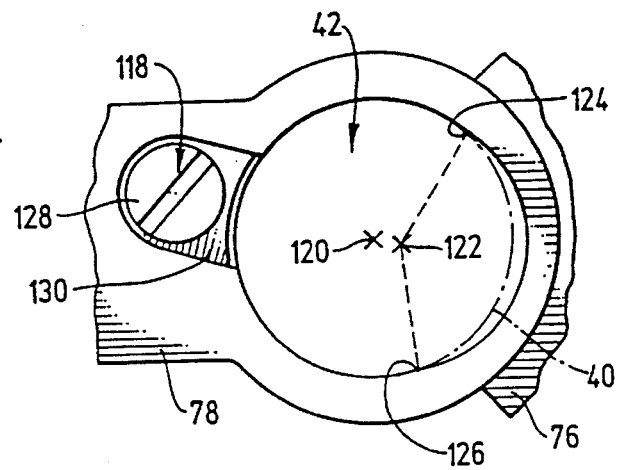
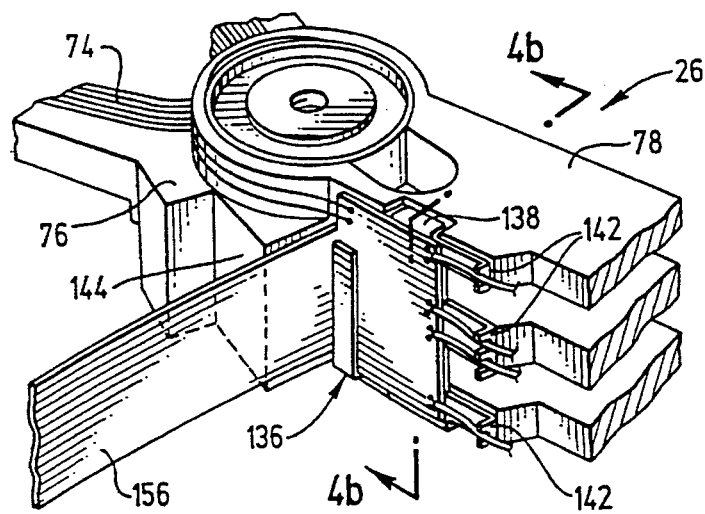
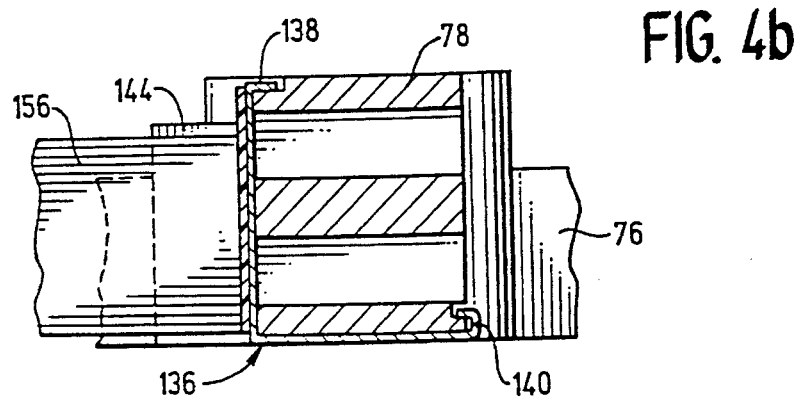

DISK DRIVE HEAD DISK ASSEMBLY ACTUATOR MOUNT MECHANISM

This is a division of application Ser. No. 08/089,705, filed on Jul. 9, 1993, now U.S. Pat. No. 5,455,728; which is a division of Ser. No. 07/802,347 filed on Dec. 4, 1991, now U.S. Pat. No. 5,270,887.

BACKGROUND OF THE INVENTION

1. Field of the Invention

The present invention relates to data storage devices. More particularly, the present invention relates to rotating disk magnetic data storage devices.

2. Description of the Prior Art and Related Information

Rotating disk magnetic data storage devices, commonly referred to as disk drives, have undergone dramatic improvements in data storage capacity and data access times in recent years. At the same time, high performance portable computers have become increasingly prevalent. These require a high data storage capability in a compact environment. The constraints imposed by portable computers, as well as the decreasing footprints of desk top personal computers, have increased the need for high performance disk drives having compact dimensions; i.e., disk drives having a compact "form factor."

In order to provide a compact form factor high capacity disk drive, the major disk drive components must be carefully integrated into the disk drive housing. In particular, the principal mechanical and electromechanical components of the drive must be integrated together in a compact environment encased by a substantially airtight housing. These components and housing are typically referred to as the disk drive head disk assembly (HDA).

Of the basic components of the HDA, the actuator, which supports the read/write transducer heads, and the actuator motor are perhaps the most critical for achieving the rapid access times desired for modern disk drives. A "voice coil" actuator/actuator motor design is presently preferred for most modern high performance disk drives. In such a design, the actuator is pivotally mounted and has a "voice coil," in the form of a coil of wire, attached to the end of the actuator opposite the magnetic read/write heads. This voice coil is configured inside a magnet assembly in a manner such that energization of the voice coil causes an electromagnetic interaction with the stationary magnets to pivot the actuator about its mount to thereby rotate the magnetic read/write transducers in an arc across the data tracks on the disk surface.

Although voice coil actuators provide rapid access times and the potential for high data storage densities, problems are presented by the essentially free motion of the voice coil and actuator. That is, the voice coil and attached actuator are unconstrained by any mechanical motor components and, in response to an energizing current in the voice coil, will pivot freely in response to the force between the magnetic field induced in the coil and the permanent magnet. It will thus be appreciated that if a suitable braking force is not applied, the voice coil and actuator may pivot the magnetic transducer heads completely off the disk surface. Alternatively, the heads may crash into the spindle in the center of the disks if not restrained.

In normal operation, such a braking force will always be applied once the magnetic transducer heads have been moved to the desired data track on the disk surface. Where a power failure occurs, however, or an error occurs in the reading of position information (e.g., off the disk surface), it is possible that the actuator and attached transducer heads can overshoot the destination track and potentially move off the operational region of the disk surface. Additionally, when the drive is turned off, or is inactive to save power in absence of a command from the host computer, no current will be applied to the voice coil. In this state, due to the free pivoting of the actuator about its mount, the actuator and attached read/write heads may be moved off the disk surface by a disturbing force, such as jarring of the disk drive.

Accordingly, it is necessary to provide some means to prevent the voice coil actuator from rotating off the disk surface. Additionally, some type of a latching mechanism is needed in order to prevent the voice coil motor and transducer heads from moving about when the drive is turned off or otherwise not actively maintaining the actuator and heads at a desired position.

One conventional means for restricting the motion of the actuator employs simple mechanical "crash stops." These are typically some type of cushioned piece, provided on either end of the voice coil angular range. These cushioned stops limit the movement of the voice coil while reducing the shock provided to the actuator and transducer heads. One type of conventional latch mechanism in turn employs a mechanical latching structure which has a detent or catch which the voice coil engages.

Such mechanical latch structures and cushioned crash stops are suitable for disk drives where the space is not severely constrained. In modern very compact disk drives, however, the distance over which the voice coil must travel to engage the mechanical latch can be significant, since the portion of angular travel of the actuator arm during which the latching occurs corresponds to usable space on the disk surface. In modern applications where both high density and compact size are required, travel ranges during latching of as little as 50 mils. may result in significant lost data capacity. Similarly, unnecessary travel in the crash stops reduces otherwise useful disk surface area which may be used for data storage.

An additional consideration for very compact disk drives relates to the mounting mechanism for the actuator assembly. The actuator assembly must be free to pivot so as to move the transducer heads attached thereto readily from track to track in an accurate manner. In compact disk drives, this requires a very secure and compact mounting structure which is nonetheless easy to assemble during the manufacturing process. Furthermore, the circuit wiring which connects the read/write magnetic transducer heads to the disk drive read/write and servo electronics must not interfere with the precise rotational motion of the actuator. Furthermore, it is highly desirable to have the wiring detachable from the actuator assembly to allow replacement or repair of the actuator assembly in a relatively straightforward manner.

An additional consideration, which becomes increasingly significant for compact disk drives, is the need to keep the air in the disk drive housing relatively free of dust particles and other contaminants. In particular, in high performance disk drives the flying height of the transducer heads may be lower. As a result dust or other contaminants can more readily interfere with the head/disk interface, causing the heads to "crash" or otherwise interfering with the reading/writing of data onto the disk surface. Additionally, in order to maintain high data capacity while reducing disk size for modern compact disk drives, it is necessary to increase the data storage density of the magnetic media on the disk surfaces. This further renders the disk surface susceptible to data loss due to contaminants which may enter the disk drive housing and settle on the disk surface. Additionally, portable computers expose the computer and disk drive incorporated therein to a wide variety of environments where high levels of dust or other contaminants may be present. As a result, the disk drive must be provided in a housing which is sealed to prevent dust or other contaminants from entering the disk drive compartment.

In conventional disk drives, a gasket is typically employed between the upper and lower sections of the housing to provide a substantially airtight seal to the disk drive housing. Although this approach can be effective, space must be made for the gasket at the junction between the two sections of the housing. This in turn requires additional thickness for the housing walls, which can add undesired weight and size to the overall disk drive housing. This added weight and size becomes increasingly unsatisfactory for compact disk drives required for laptop computer applications. Additionally, the use of a gasket creates problems during assembly of the disk drive since the gasket is an unsupported piece which is not well suited for precise and rapid assembly. Furthermore, various components in the HDA are sensitive to electromagnetic interference and external electromagnetic fields may partially penetrate the HDA through the gasket.

Accordingly, a need presently exists for a compact disk drive head disk assembly which avoids the above-noted problems.

SUMMARY OF THE INVENTION

The present invention provides a compact disk drive head disk assembly configured within a sealed housing. The present invention further provides a head disk assembly which is easy to assemble despite the compact size and while maintaining precise mechanical relationships between the components of the assembly.

The head disk assembly of the present invention includes a base and a cover having a shape matching the base and adapted to fit on top of the base. Mounted on the base are one or more magnetic data storage disks and a spindle motor, adapted to rotate the disks at a high angular velocity. An actuator assembly is pivotally mounted to the base and supports read/write transducer heads over the data surfaces of the magnetic data storage disks in a manner so that the read/write heads may be moved radially to concentric data tracks on the disk surfaces. The actuator assembly is mounted to the base through a post/bearing structure, fixedly mounted to the base, and an opening in the assembly adapted to receive the post bearing structure. The mounting opening has a double bore cylindrical shape, with a major bore and an eccentric bore with a slightly offset axis. The post is cylindrical in shape such that when the post is secured against the inside of the opening a three point mount force is provided. In a preferred embodiment, the mounting force is provided by a vertical screw and washer assembly which compresses a rubber member and forces it laterally to engage the mounting post against the side of the cylindrical opening. This three point mount between the actuator and post/bearing allows accurate and reliable registration of the actuator and is readily assembled during manufacture of the disk drive.

The actuator assembly also preferably includes a snap-on attachment mechanism for the flex circuit which provides an electrical connection between the read/write transducer heads and the actuator motor and the control electronics. More specifically, a snap-on clamp is affixed to one end of the electrical flex circuit. The snap-on clamp is adapted to be simply snapped into place on the actuator structure which has slots for receiving matching engagement tabs on the snap-on clamp. Electrical wires extending from the read/write transducer heads and actuator motor may then be simply soldered into electrical connection with leads on the flex circuit. A wedge shaped extension on the actuator, adjacent the snap-on clamp, guides the flex circuit away from the actuator at an angle so that the flex circuit provides substantially no bias force on the actuator. A flex circuit mounting bracket is preferably provided to secure the flex circuit relative to the base of the housing and feed it through the base where it is connected to a printed circuit board attached to the bottom of the surface of the base, which printed circuit board includes the servo and read/write control electronics. This mounting bracket further ensures the flex cable is maintained at an angle providing minimal bias torque on the actuator.

The head disk assembly of the present invention further includes a compact voice coil actuator motor. The voice coil actuator motor includes a voice coil attached to the actuator at the opposite end from the read/write transducer heads, a voice coil magnet assembly which electromagnetically engages the voice coil to rotate the actuator, and an integrated latch and magnet spacer assembly. More specifically, the voice coil preferably comprises a generally triangular shaped coil of wire bonded to the interior portion of a V-shaped voice coil mounting member on the end of the actuator opposite the read/write transducer heads. A latch pin and mount is bonded to the end of the voice coil. The magnet assembly includes a permanent magnet and upper and lower magnet plates spaced apart by the latch assembly. The voice coil is configured within the space between the upper and lower magnet plates and moves freely in response to energization of the voice coil.

The integrated latch/spacer assembly includes a magnetic latch for limiting the angular range of the actuator and latching the actuator when the drive is not in use. The latch is mounted at one extreme angular position of the actuator corresponding to an inner landing zone on the disk surfaces for the read/write heads. The magnetic latch employs a small strong permanent magnet and two pole pieces. The magnet pole pieces of the latch are adapted to magnetically engage the latch pin on the voice coil. The latch pin preferably has a freedom to pivot slightly in the latch pin mount assembly so as to ensure it firmly engages both magnetic pole pieces of the latch. The combination of the latch magnet strength, magnet pole piece spacing and flexible mounting of the latch pin provides a firm and repeatable latching force which nonetheless drops off very rapidly with distance. As a result, very little of the data surface on the magnetic disk is taken up by the angular latching region. The magnetic latch structure also serves as a crash stop to prevent angular motion of the actuator past the read/write head landing zone.

At the other extreme angular range of the actuator, a second crash stop is provided in the form of a U-shaped member extending from the latch/spacer structure. The U-shaped member functions substantially as a cantilever spring to cushion the impact of the latch pin support against the crash stop. This reduces the possibility of damage to the read/write transducer heads or the alignment of the actuator assembly due to shock from such impact.

In a further feature of the present invention the junction between the base and cover of the head disk assembly is provided with a substantially airtight seal by covering such junction with a tape seal which encompasses the outside periphery of the junction. A very shallow indentation is provided in both the base and cover, surrounding the junction between the cover and base when assembled, to allow the tape seal to be pressed substantially flush with the outside edges of the cover and base.

In a preferred embodiment, the indentation and tape seal are approximately 13.5 mils. thick, thereby providing a very negligible impact on the dimensions and weight of the disk drive as a whole. The tape seal preferably has a substrate of aluminum foil on a polyester backing on one side and an adhesive deposited on the other side of the substrate. The adhesive is preferably approximately three times the thickness of the substrate. An acrylic adhesive having a relatively high surface tension may preferably be employed. The adhesive side of the tape seal is pressed into the indentation in the cover and base and provides a desired airtight seal despite possible misregistration of the base and cover portions of the housing and/or irregularities in the cast surface of the base and housing. Furthermore, due to the relatively high surface tension of the acrylic adhesive, the adhesive will not separate from the substrate even if it is necessary to remove the seal for repair work on the disk drive. This thus provides a simple and low cost seal for the junction between the base and cover of the housing, while at the same time providing a visual indication of whether or not the disk drive has been mishandled or improperly opened so as to destroy the critical particle free environment within the disk drive housing.

Accordingly, it will be appreciated that the present invention provides a compact disk drive head disk assembly, adapted for accurate and rapid assembly during manufacture. Additionally, the present invention provides a compact disk drive head disk assembly having a substantially contaminant free environment, which is preserved by a low cost and lightweight seal. Further features and advantages of the present invention will be appreciated by a review of the following detailed description of the invention.

BRIEF DESCRIPTION OF THE DRAWINGS

FIG. 3b is a cross-sectional view and FIG. 3c is a top view of the actuator mount mechanism of the head disk assembly of the present invention.

FIGS. 4a and 4b are perspective and side views, respectively, illustrating the flex circuit mounted on the actuator of the head disk assembly of the present invention.

DETAILED DESCRIPTION OF THE INVENTION

Figure 1A:
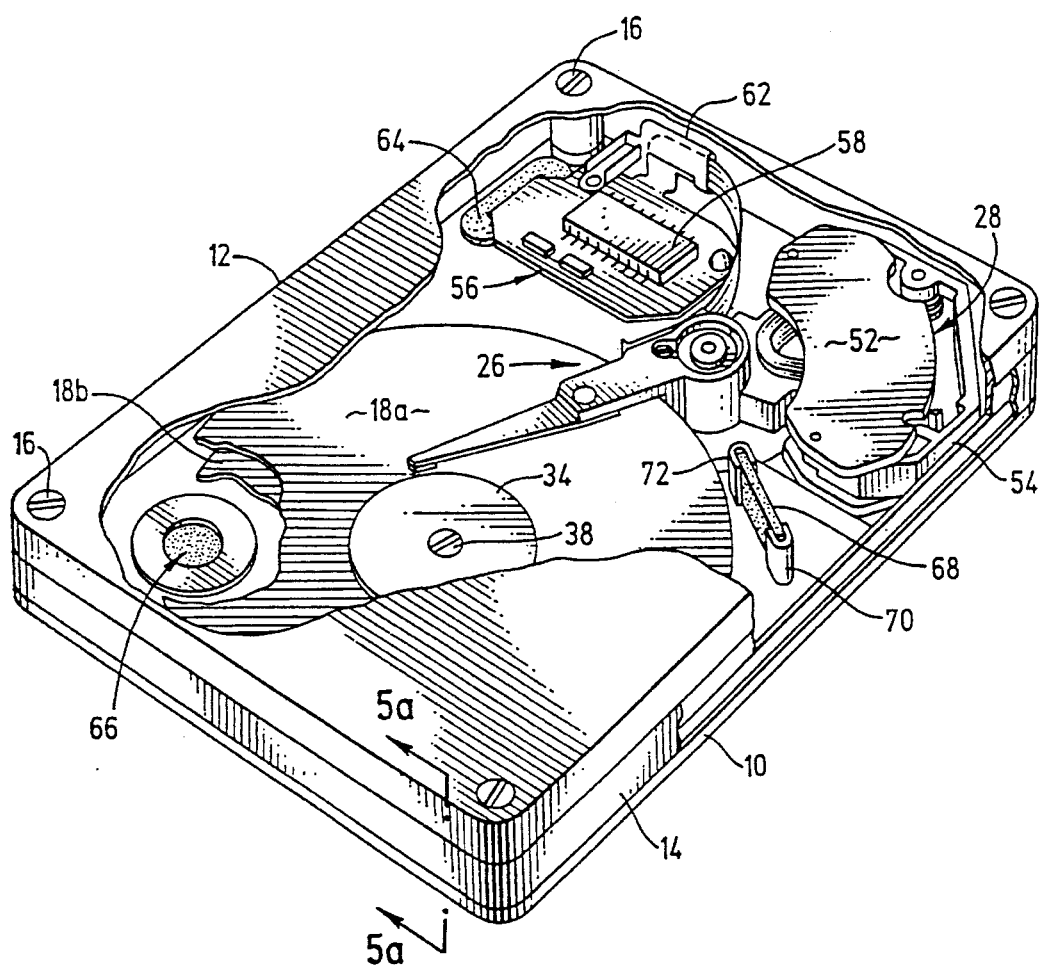
FIG. 1a and FIG. 1b are perspective and exploded views, respectively, of a preferred embodiment of the compact disk drive head disk assembly of the present invention.
Figure 1B:
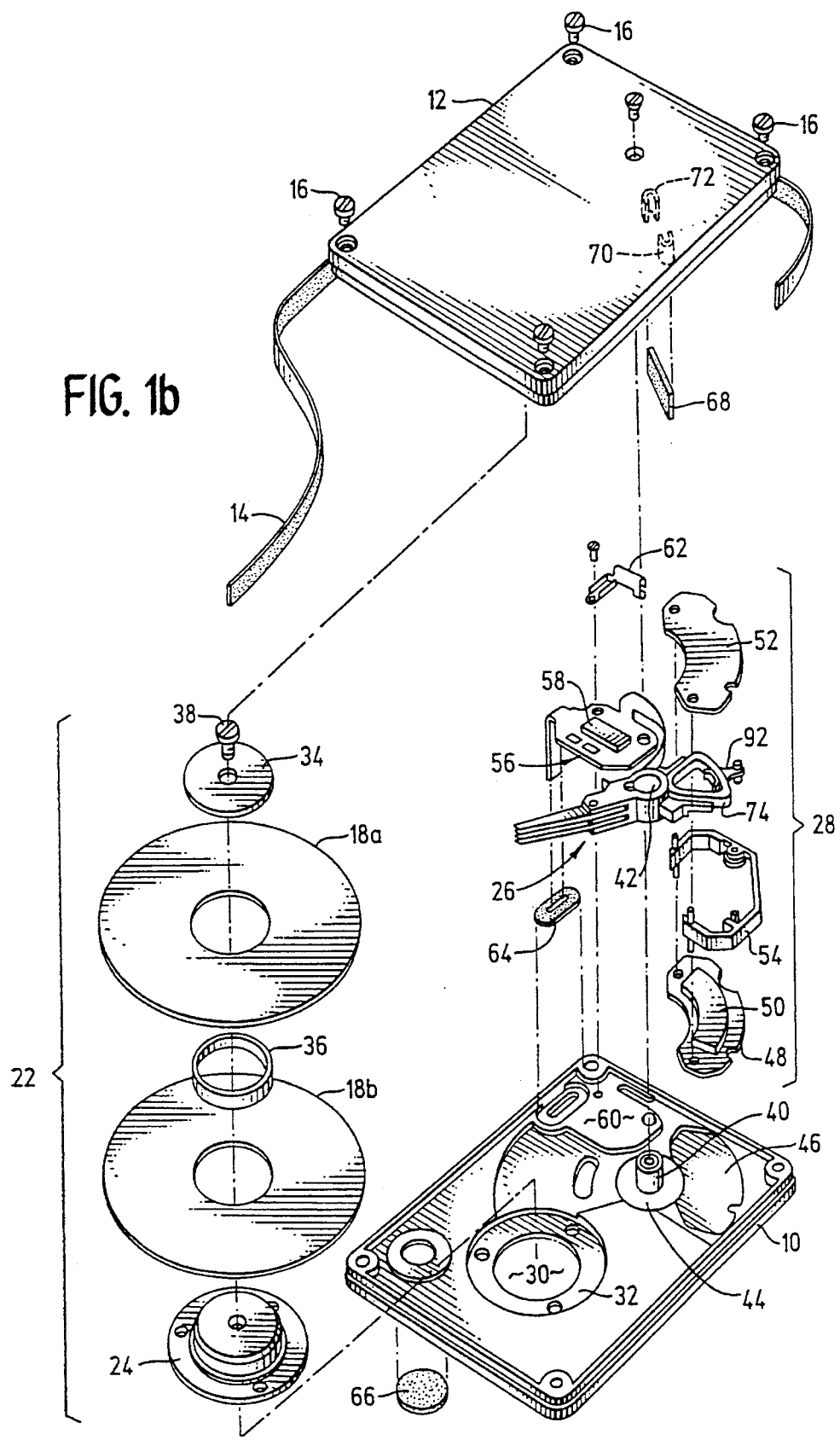

Referring to FIGS. 1a and 1b, a preferred embodiment of the compact disk drive head disk assembly of the present invention is illustrated in perspective and exploded views, respectively.

The illustrated head disk assembly (HDA) includes the major mechanical and electromechanical components of the disk drive, mounted within a housing formed by base 10 and cover 12. Base 10 and cover 12 are preferably made of die cast aluminum having matching dimensions so as to form a sealed enclosure. The cover 12 may conveniently be mounted to base 10 through screws 16 engaging matching threaded openings in base 10. The contact surface between base 10 and cover 12 may be made substantially airtight by tape seal 14. As will be discussed in more detail below, this allows a substantially particle free environment to be maintained within the housing. In a presently preferred embodiment, having two magnetic data storage disks 18a and 18b, the dimensions of the assembled housing are approximately 0.75 inches high by 3.94 inches long and 2.75 inches wide. It will be appreciated, however, that the present invention may be embodied in other form factors.

As illustrated in FIGS. 1a and 1b, the principal HDA mechanical and electromechanical subassemblies are mounted to the base 10 in a very compact layout. The principal subassemblies of the HDA are: disk stack assembly 22; spindle motor 24; actuator assembly 26; and voice coil magnet assembly 28. As may be best appreciated from FIG. 1b, these subassemblies of the HDA are maintained in a precise relationship in the compact environment within the housing by precisely machined mounting positions on base 10.

More specifically, base 10 is provided with circular spindle motor mounting opening 30 which allows the spindle motor 24 to extend below the bottom surface of base 10 and be mounted securely to the base 10 through mounting holes 32 and matching bolts (not shown). The disk stack assembly 22 is in turn mounted to spindle motor 24 through disk clamp 34 and spacer 36 through a single mounting screw 38.

The actuator assembly 26 is mounted on base 10 through mounting post 40 and matching cylindrical opening 42 in the actuator. The mounting post 40 has an inner post, which is riveted or otherwise rigidly mounted to base 10, and an outer sleeve rotatably coupled to the inner post through a ball bearing and race assembly. The outer sleeve engages the opening 42 in the actuator through a three point mounting system, discussed in more detail below. The actuator assembly 26 is preferably mounted in a machined, slightly recessed, portion 44 of the base 10 which facilitates mechanical alignment of the actuator assembly on the base during assembly.

The voice coil magnet assembly 28 is mounted into a machined recess 46 which is similarly designed to provide accurate registration of this component during assembly of the disk drive. The voice coil magnet assembly 28 may preferably be riveted or screwed firmly into place in recess 46 through bottom magnet plate 48 which has a permanent magnet 50 adhesively bonded to. The magnet assembly also includes an upper magnet plate 52 and a latch/spacer member 54 which may preferably be firmly held in place against lower magnet plate 48 by the magnetic force applied to upper magnet plate 52, in a manner described in more detail below.

Turning more specifically to each of the subassemblies of the HDA, the magnetic data storage disks 18a, 18b, of the disk stack assembly 22 are thin rigid platters, preferably made of aluminum coated with a layer of nickel. The surfaces of the disks 18a, 18b are coated with the magnetic media and a thin film of carbon overcoat is provided on top of the magnetic media to protect it from wear and abrasion from the read/write heads. Additionally, a lubricant is preferably provided in a thin layer on top of the carbon overcoat to provide further protection between the read/write heads and the media during initial starting and stopping of the drive when the heads contact the surfaces as they are initially caused to fly above the disk surfaces and allowed to land on the disk surfaces, respectively. In this regard, the innermost region of the surfaces of the disks 18a, 18b is preferably employed as a landing zone for the read/write heads; that is, the inner region of the disk surfaces is not employed for data storage and is used as the resting place for the read/write heads when the drive is inactive. Single screw disk clamp 34 rigidly clamps the disks 18a, 18b to a rotatable hub and spindle motor 24.

Spindle motor 24 preferably is a commercially available brushless three phase motor having the disk mounting hub coupled thereto through a spindle bearing assembly (not shown). The spindle motor 24 rotates the disks 18a, 18b at a constant speed; in a preferred embodiment 3383 R.P.M. The speed of the spindle motor is preferably monitored by sensing the back EMF from the spindle motor 24 to derive the spindle angular position and speed. This information is then used to provide a drive current to the spindle motor 24 to stabilize the angular velocity at the desired R.P.M.

As further illustrated in FIGS. 1a and 1b, the actuator assembly 26 also preferably includes a flex circuit 56 for electrically connecting the magnetic transducer heads and voice coil to the servo and read/write control electronics. More specifically, the flex circuit 56 connects the read/write transducer heads to the read/write control electronics and servo electronics and connects the voice coil to the servo electronics through thick film connective leads encased in a flexible plastic carrier. Additionally, the flex circuit 56 may include an integrated circuit (IC) 58, for example a preamp circuit for the read/write channel, to take advantage of the space within the disk drive housing, with the remainder of the integrated circuits and other control electronics preferably being located on a printed circuit board (not shown) attached to the underside of base 10. The portion of flex circuit 56 containing the IC 58 may preferably be mounted on a slightly raised mesa 60 in base 10 on which it is secured through clamp 62. In addition to holding the flex circuit in place on the mesa 60, the clamp 62 also holds the flex cable portion of the flex circuit in a manner so as to reduce the bias provided to the actuator assembly 26 from the inherent spring loading of the flex circuit as the actuator rotates. Additionally, the height of mesa 60 is chosen so as to allow the flex circuit 56 to align vertically with the actuator assembly 26. The flex circuit 56 exits the base 10 through an opening (not shown) which is sealed through gasket 64.

As further illustrated in FIGS. 1a and 1b, an air filtration system is provided by means of air access port and breather filter 66 in base 10, and recirculating air filter 68 which is held in place by filter mounting brackets 70, 72 in cover 12.

Recirculating air filter 68 cleans the air within the HDA, and in particular traps any particulates which may be generated during spindle start and stop operations. This filter 68 is configured adjacent to the disks 18a, 18b such that the air circulation within the housing caused by the disks will pump air through filter 68. Breather filter 66 cleans any air entering the HDA and also equalizes pressure within and without the housing. Preferably, the disk drive is assembled in a Class 100 environment and the air filtration system substantially maintains such Class 100 within the disk drive. Also, as will be described in more detail below, tape seal 14 further ensures such a contaminant free environment within the disk drive housing by virtue of its sealing the entire junction between the base 10 and cover 12 so as to minimize the possibility of entry of contaminants through this junction.

Referring to FIGS. 2a, 2b, 2c, 2d and 2e, the HDA actuator assembly 26 and voice coil magnet assembly 28 are shown in more detail. As may be seen, the actuator assembly 26 includes a voice coil 74 held in place by a V-shaped voice coil support member 76. Voice coil support member 76 is preferably formed as an integral piece with actuator "E-block" 78 which supports the flexures or support arms 79, which in turn support read/write transducer heads 81. The voice coil 74 is formed of a copper wire coil which is adhesively bonded to the V-shaped voice coil support member 76. The voice coil 74 is supported in the space between upper magnet plate 52 and magnet 50 by support member 76 so as to be freely rotatable through an arcuate range corresponding to the usable surface of the magnetic disks 18a and 18b.

The space for the voice coil 74 is created by latch/spacer 54, which may preferably be a single piece structure, for example, made of plastic. Spacer 54 snaps into bottom magnet plate 48 through two pins in the bottom of spacer 54 which engage matching openings in bottom magnet plate 48. Upper magnet plate 52 in turn firmly holds spacer 54 in place and is itself firmly held in place by pins 80, 82 in spacer 54 and matching holes 84, 86 in magnet plate 52 by the magnetic force between the plate 52 and magnet 50. This thus holds the voice coil magnet assembly 28 securely in place in a manner which is readily assembled during manufacture of the disk drive and which may also be disassembled easily in case the drive needs repair. An indentation 87 is provided in the upper and lower magnetic plates 48, 52 to ensure that the magnetic circuit of the magnetic latch, described below, and that of the voice coil motor are decoupled.

Figure 2A:
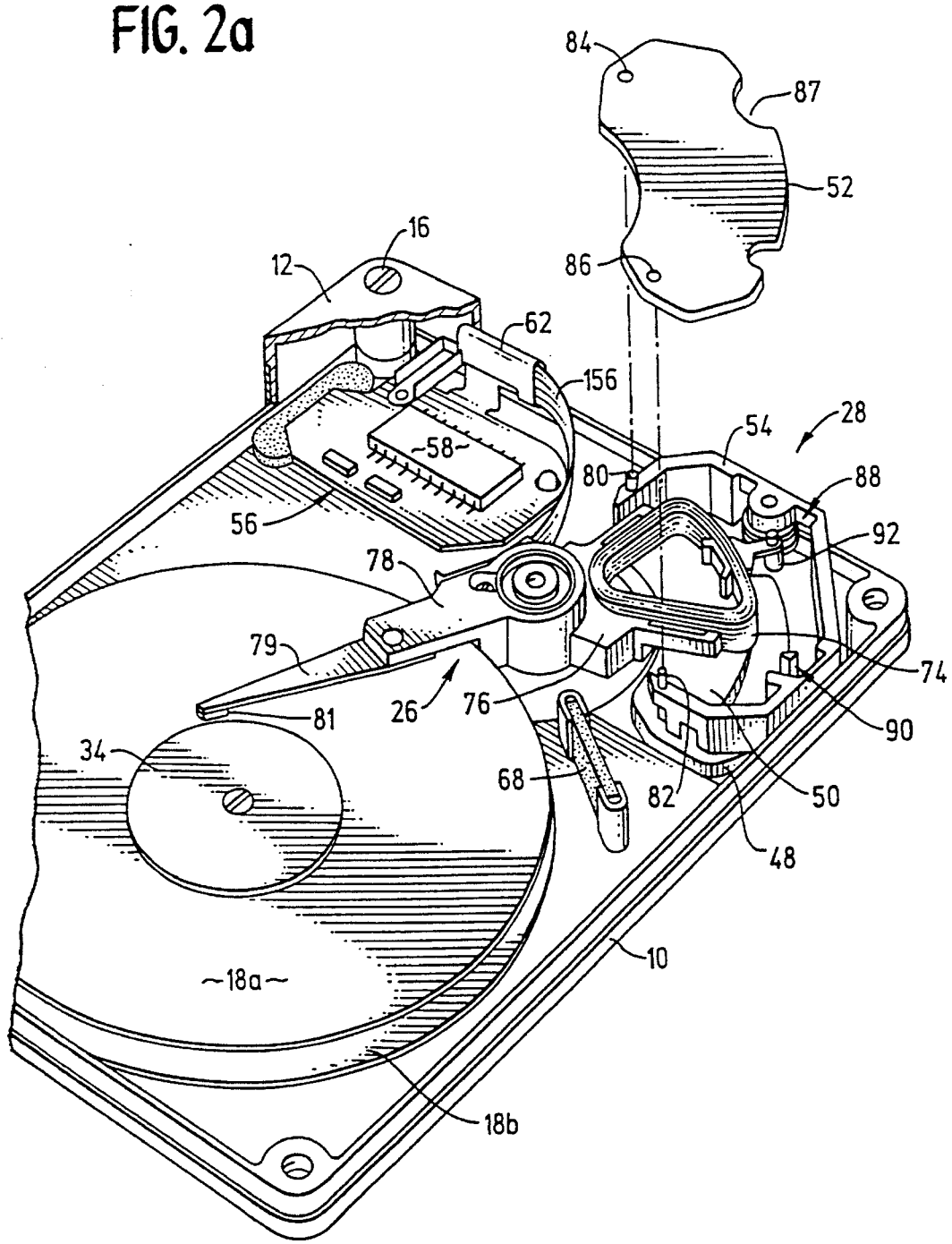
FIG. 2a is a perspective cut away view showing a portion of the actuator and the voice coil magnet assembly of the head disk assembly of the present invention.
Figure 2B:
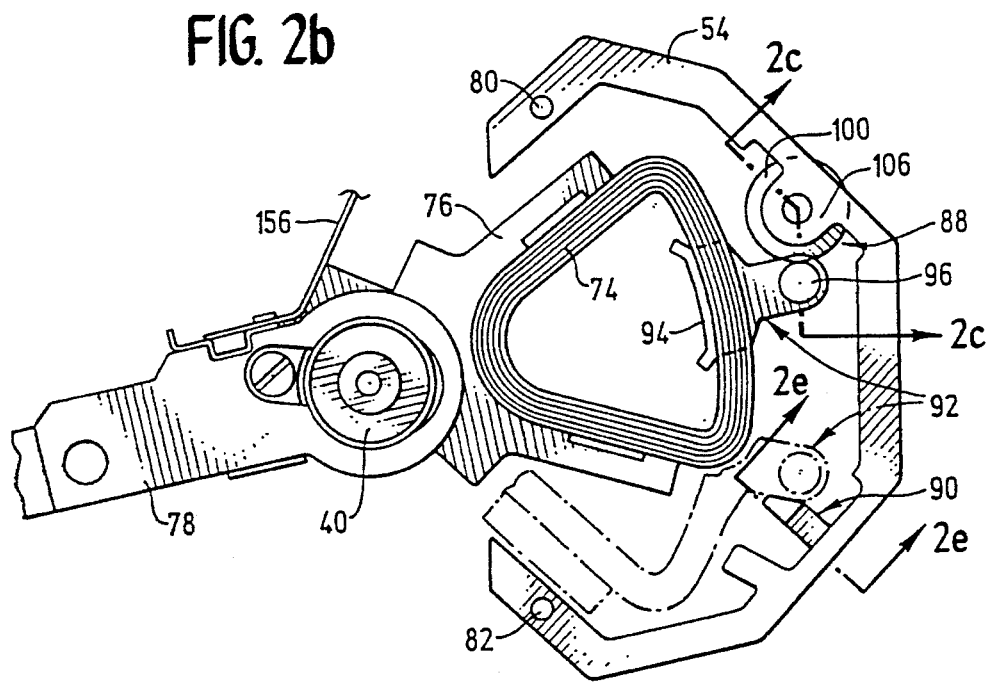
FIG. 2b is a perspective view of the integrated latch and magnet spacer of the head disk assembly of the present invention.

As further illustrated in FIGS. 2a and 2b, the angular motion of the actuator assembly 26 is constrained at first and second angular positions, respectively, by latch 88 and crash stop 90. Latch 88 and crash stop 90 engage the actuator assembly through a latch pin assembly 92 which is bonded to the extreme outer end of the voice coil 74. As shown more clearly in FIG. 2b, this latch pin assembly 92 extends away from coil 74 so as to engage latch 88 at a first angular position and crash stop 90 at a second angular position (shown in phantom in FIG. 2b). The latch pin assembly 92 preferably includes a plastic latch pin mount 94, which is adhesively bonded or otherwise firmly mounted to voice coil 74, and a latch pin 96. Latch 88 and crash stop 90 thus constrain the angular motion of the actuator so as to maintain the magnetic transducer heads on the operational surface region of the magnetic disks.

Figure 2C:
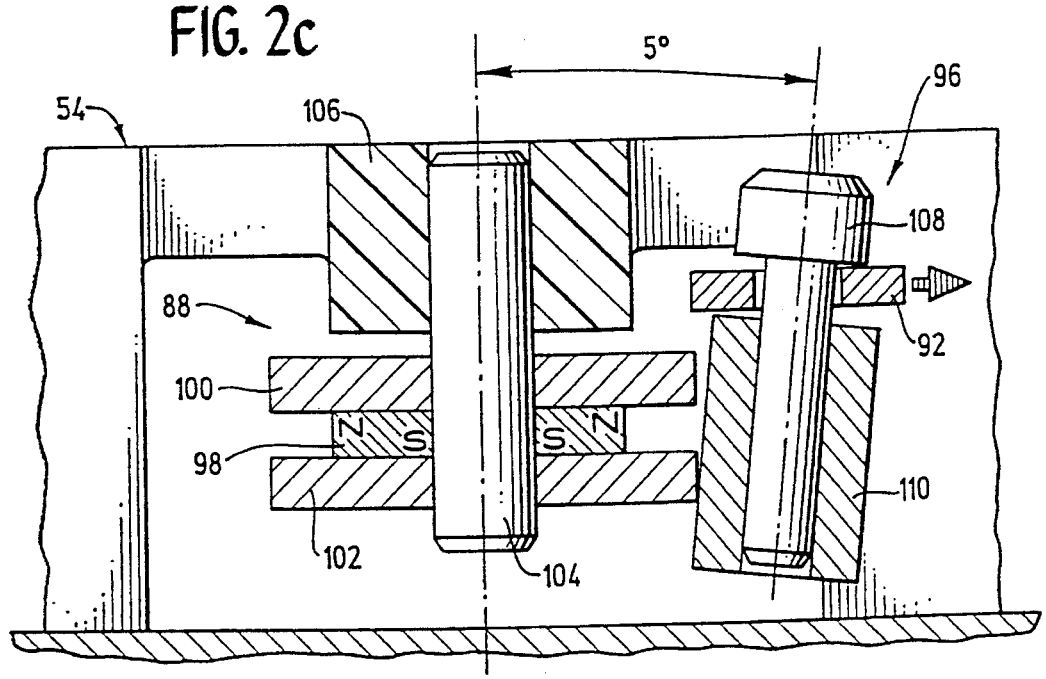
FIG. 2c is a cross-sectional view of the magnetic latch structure of the head disk assembly of the present invention.

Referring to FIG. 2c, the structure of the latch 88 and latch pin 96 are illustrated in more detail in a sectional view. As illustrated, the latch structure 88 preferably includes a thin disk shaped permanent magnet 98 held between two disk shaped metallic pole pieces 100, 102, which are secured to spacer 54 through support pin 104 which is fixedly mounted in an annular portion 106 of spacer 54 (shown most clearly in FIG. 2b). Spacer 54 is partially cut away on the sides of annular mounting portion 106, as shown in FIGS. 2b and 2c, so as to provide some flexibility for mounting portion 106 to bend when hit by latch pin 96, so as to reduce G forces on the actuator assembly when latch 88 functions as a crash stop. As further illustrated in FIG. 2c, latch pin 96 preferably comprises a support pin 108, for example, made of plastic, with a metallic cylindrical sleeve 110 bonded to the bottom portion of support pin 108. As shown, the support pin 108 has a larger upper portion and a narrower cylindrical section which fits through an opening in latch pin support member 92. The opening in support member 92 is made somewhat larger than the cylindrical portion of support pin 108 to allow a lateral movement of the latch pin 96. For example, in the illustrated embodiment of FIG. 2c, a 5° movement from vertical is allowed by the space between the support pin 108 and support member 92. This allows the pin to disengage the latch magnet poles 100, 102 one at a time as the actuator is driven away from the latch during the start up of the drive, as shown by the arrow in FIG. 2c. This allows the release force to be very consistent even if a slight misregistration between the alignment of the upper and lower magnet poles 100, 102 would otherwise cause deviation in the latching force. The appropriate spacing between pin 108 and support member 92 may be set by using a shim to measure the space to provide the desired 5° lateral motion of pin 96. It will be appreciated, however, that other degrees of lateral motion may be provided while still providing a substantially constant release force on the latch pin 96.

The strength of magnet 98, its thickness, and the associated spacing between upper and lower magnet pole pieces 100, 102 are chosen to provide a secure latching force which nonetheless drops off rapidly with separation of latch pin 96 from the latch magnet. More particularly, in a preferred embodiment, magnet 98 is a high strength compression molded magnet made of a magnetic material such as neodymium iron boron or samarium cobalt. The spacing between magnet pole pieces 100, 102 and the corresponding thickness of magnet 98 in turn are preferably approximately 15 mils. This combination of magnet strength and thickness, a fixed magnet structure and a floating latch pin 96 provides a very secure latching force which nonetheless drops off rapidly with distance and also provides a very consistent release force. This combination of features thus results in a minimum loss of usable data storage space on the disk surfaces due to the angular stroke of the actuator taken up by the latching function. For example, for the dimensions and magnet type noted, approximately only 5 mils. of radial disk surface space will be taken up by the latching function, in contrast to a minimum of approximately 50 mils. for conventional mechanical matching mechanisms.

Figure 2D:
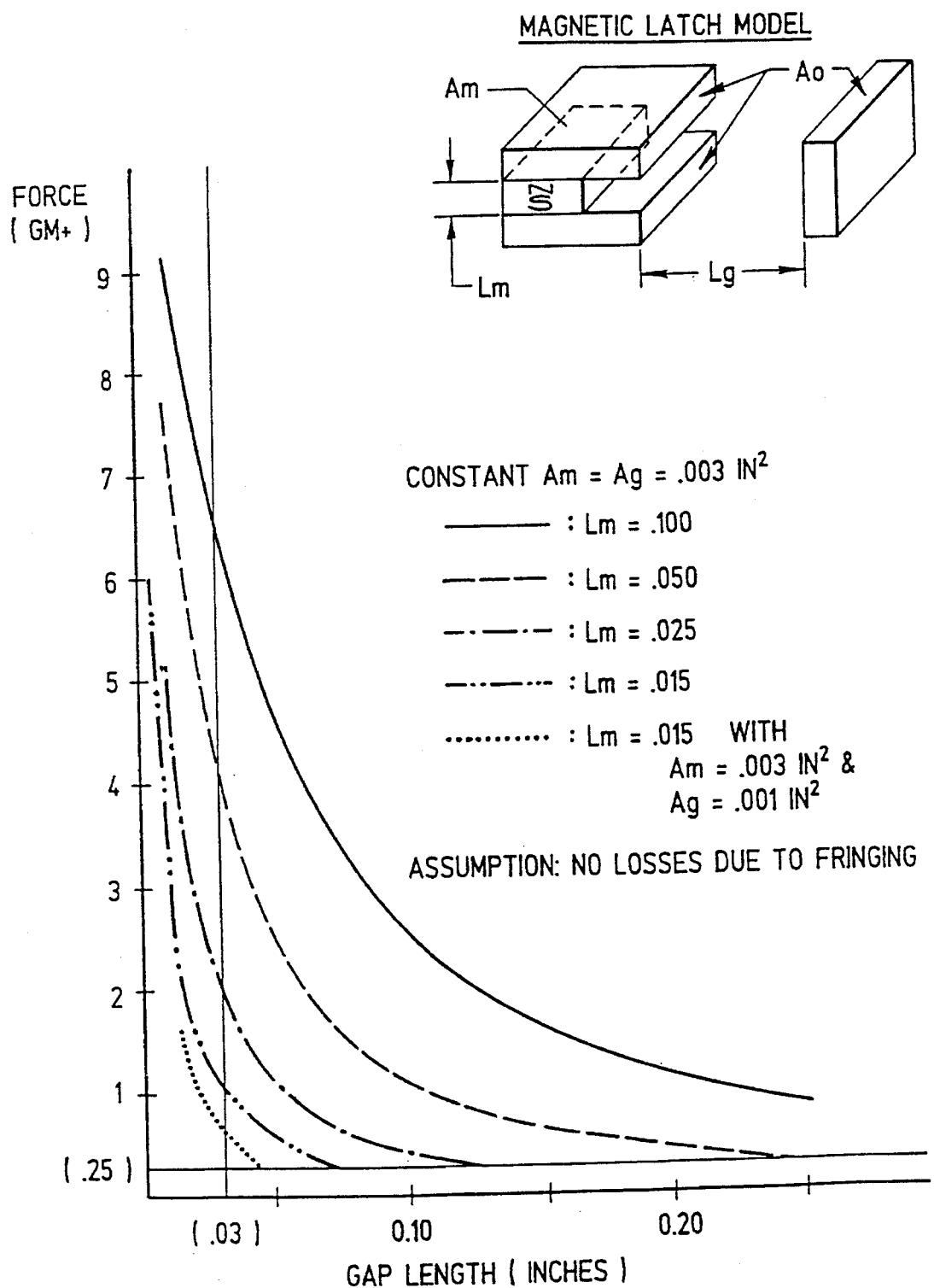
FIG. 2d is a graph illustrating the force versus distance characteristics of the magnetic latch of the present invention.

In FIG. 2d, the latching force versus distance characteristics of the magnetic latch structure illustrated in FIG. 2c are shown for five different magnet geometries as modeled by the slightly simplified structural model illustrated in the top portion of FIG. 2d. The illustrated graphs correspond to actual measured force versus distance data. As will be appreciated by inspection of FIG. 2d, the magnetic latch of the present invention provides a rapidly decreasing force characteristic, resulting in an associated reduction in lost data storage space on the disk surface. For a preferred embodiment the latching stroke distance is limited to approximately 5 mils., and a magnet thickness and magnet pole piece spacing of approximately 15 mils. provides the desired latching force. A lower limit of approximately 10 mils. is presently needed for the magnet thickness and magnet pole piece spacing to maintain the desired latching force at contact, assuming the above noted magnet material is employed.

Figure 2E:
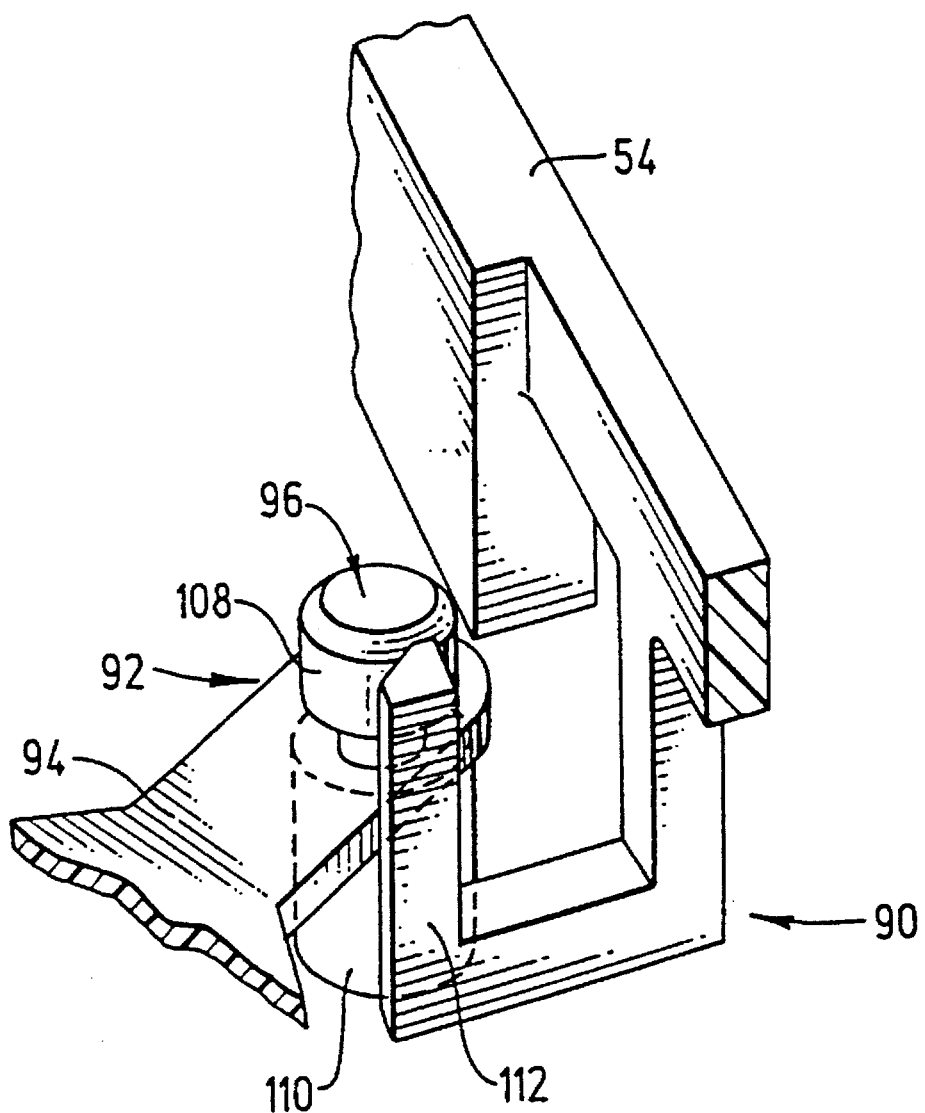
FIG. 2e is a perspective view of the crash stop of the head disk assembly of the present invention.

Referring to FIG. 2e, a preferred embodiment of the crash stop 90 is illustrated along with a portion of magnet assembly spacer 54. As shown, the crash stop 90 is preferably a generally U-shaped structure extending from magnet assembly spacer 54 down and into the path of travel of the latch pin support 92. The latch pin support 92 engages the free upright portion 112 of the U-shaped structure of crash stop 90 when the actuator reaches the extreme outside portion of the data surface of the magnetic disks. Due to the free end of the upright support 112 and the freedom to flex about both arms of the U-shaped structure 90, the impact of the latch pin support 92 against the crash stop is cushioned by flexing of the arm 112. This may thus provide a suitable cushioning of the shock to the actuator assembly which would otherwise result, while employing the same material, e.g. plastic, for the crash stop 90 as employed in the spacer member 54. As a result it will be appreciated that the illustrated crash stop 90 provides a simple but effective restraint to the angular motion of the actuator assembly while cushioning the actuator assembly against shock which might otherwise cause damage to the assembly, the heads, or disk surface, or cause misalignment of the assembly.

Figure 3A:
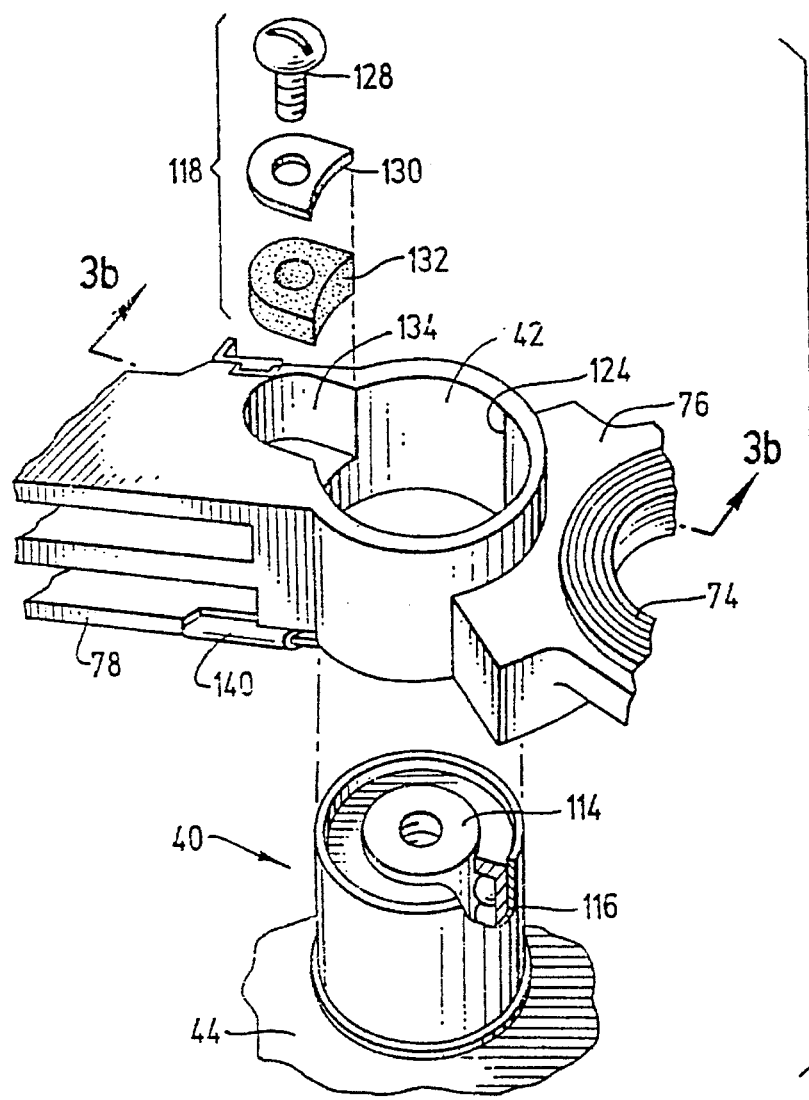
FIG. 3a is an exploded view of the actuator mount mechanism of the head disk assembly of the present invention.
Figure 3B:
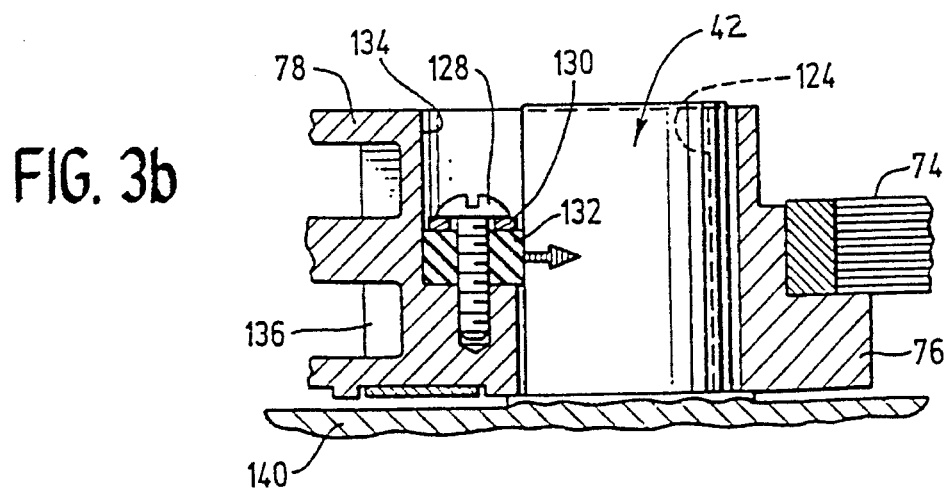

Referring to FIGS. 3a, 3b, and 3c a preferred embodiment of the mounting system for actuator assembly 26 is illustrated. As shown, the actuator assembly 26 includes generally cylindrical opening 42 having a size adapted to fit over mounting post 40. Mounting post 40 preferably includes a fixed central post 114, which is securely fixed to the base 10 of the HDA, and outer freely rotatable sleeve portion 116 coupled to the inner post 114 through a conventional ball bearing and race assembly (partially shown in cut away form in FIG. 3a). When slipped over the mounting post 40, the actuator assembly 26 is firmly and accurately mounted thereto by a three point mounting system. This three point mounting system is provided by a double axis bore for the opening 42, as illustrated more clearly in FIG. 3c, in combination with a vertical mounting screw assembly 118.

More specifically, the opening 42 has a double bore, with a first central axis 120 for the major bore of the opening 42 and a second axis 122 for an eccentric offset bore, giving the opening 42 on "eye ball" shape. This thus provides two mounting ridges 124, 126 for engaging the mounting post 40. The third mounting point is provided by the mounting assembly 118 which includes a threaded screw 128, U-shaped washer 130 and compressible U-shaped washer 132. Washer 132 may for example be a simple rubber piece having an opening adapted to receive the screw 128. The mount assembly 118 is adapted to fit in an U-shaped channel 134 adjacent to mount opening 42. As shown in FIG. 3b, as screw 128 is screwed down the rubber washer 132 is compressed squeezing it sideways in the direction of the arrow in FIG. 3b. This forces the mounting post 40 into secure engagement with the first and second mounting ridges 124, 126 in the double bore mount opening 42. This thus provides a three point mounting force between the actuator and mount post 40, thereby securely and accurately engaging these two structures. It will be appreciated that this mounting system is very easy to assemble during manufacture of the disk drive, while providing a very accurate and secure registration of the actuator assembly 26 relative to the base 10.

Figure 4C:
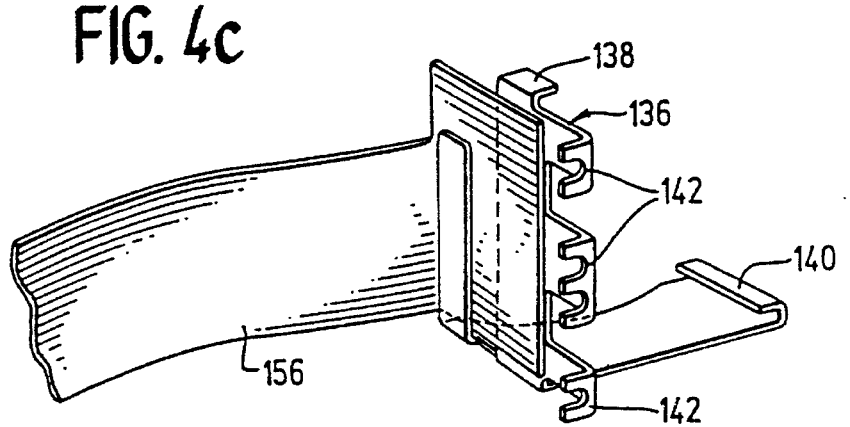
FIG. 4c is a perspective view of the flex circuit mounting bracket of the head disk assembly of the present invention.

Referring to FIGS. 4a, 4b and 4c, a preferred embodiment of the flex circuit mounting system is illustrated along with a portion of the actuator assembly 26. Flex circuit 56 is preferably mounted to the E-block 78 of actuator assembly 26 through flex cable 156 and mounting bracket 136 which is soldered or otherwise firmly affixed to one end of the flex cable 156. The flex circuit mounting bracket 136 has snap-on clamps 138 and 140 which snap into engagement with matching recesses in the E-block 78, as shown most clearly in FIG. 4b. As shown in FIG. 4c, snap-on clamp 140 includes pointed ends, or "teeth," which ensure a good electrical contact with E-block 78. This allows any electrostatic charge to be drained away by flex cable 156, which includes a ground wire therein which is soldered into electrical connection with bracket 136. The flex circuit mounting bracket 136 also includes wire engaging flanges 142 which engage wires running from the read/write transducer heads along the flexure arms. These wires are soldered into electrical connection with corresponding electrical leads in flex cable 156 adjacent the flanges 142. At the other end of the portion of flex cable 156 which is mounted in bracket 136, wires from the voice coil 74 are soldered or otherwise electrically bonded to corresponding electrical leads. It will be appreciated that the electrical connection between the flex cable 156 and the wires from actuator assembly 26 may be readily made and the flex cable 156 is simply snapped into place on the actuator block 78 by mounting bracket 136.

As further illustrated in FIG. 4a, the actuator E-block 78 preferably includes a wedge shaped extension 144 adjacent the mounting bracket 136. The surface of 144 is provided at a slightly oblique angle relative to the flat surface of the E-block which receives mounting bracket 136, to provide a corresponding angle to the flex cable 156 where it connects to mounting bracket 136. This angle is chosen to minimize the bias provided by flex cable 156 on actuator block 78 due to its inherent torsional resistance. Such a null bias reduces the potential for errors in servo operation of the actuator due to extraneous forces introduced by the flex cable 156.

Figure 5A:
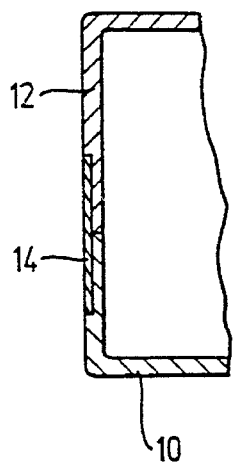
FIG. 5a is a sectional view of a portion of the housing of the head disk assembly of the present invention showing the tape seal covering the junction between the base and cover.
Figure 5B:
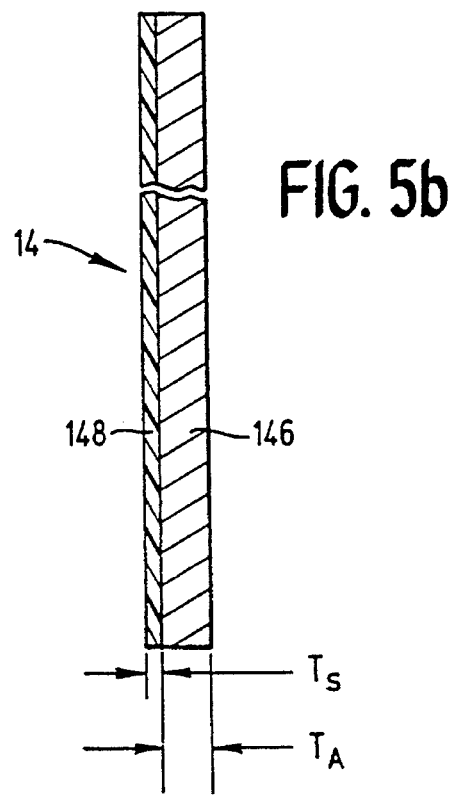
FIG. 5b is a cross-sectional view of a portion of the tape seal.

Referring to FIGS. 5a and 5b, a section through the housing of the HDA illustrates the tape seal in a preferred embodiment of the HDA of the present invention, along with an enlarged view of the tape seal. As shown, the junction between base 10 and cover 12 of the HDA is sealed by tape seal 14 which is recessed into matching indentations in base 10 and cover 12. Due to inevitable errors in the casting of the base 10 and cover 12, slight misregistrations will occur at the junction making it difficult to provide an airtight seal. Additionally, the surface finish of the cast base and housing is limited in smoothness and this roughness can cause additional areas where the seal does not form an airtight boundary between base 10 and cover 12. At the same time, however, it is desirable to minimize the space and weight devoted to the tape seal 14.

In order to offset these problems, an adhesive backing 146 is provided on tape seal 14 which is thicker than the underlying substrate 148. This provides the desired degree of airtight sealing to the juncture between the base 10 and cover 12 without significantly adding to the size and weight of the tape seal 14. These relative dimensions are illustrated generally in FIG. 5b, where the thickness of the substrate $T_s$ and the thickness of the adhesive $T_A$ are illustrated. In a preferred embodiment, the thickness $T_A$ may be approximately three times $T_s$; for example, approximately 3.5 mils. and 10 mils., respectively.

Preferably, the substrate 148 is a polyester strip, coated with a thin layer of aluminum. Substrate 148 preferably has a one piece construction of a length sufficient to wrap entirely around the HDA housing to cover the junction between base 10 and cover 12. The use of a single piece tape seal avoids possible air leak points where separate pieces would otherwise have to join. Additionally, the aluminum foil provides shielding of the HDA components from electromagnetic interference from external electromagnetic fields. The adhesive 146 in turn is preferably an acrylic adhesive having a greater tendency to bond to itself than to the aluminum surface of the base 10 and cover 12; that is, having a relatively high surface tension. For example, a suitable adhesive is a commercially available acrylic adhesive manufactured by 3M Corporation, manufactured under the trade name VHB™. In particular 3M VHB acrylic adhesive number 9473 has been found to have a suitable surface tension and sealing ability. A suitable substrate is commercially available from 3M, for example, model number 8053 polyester film substrate.

It has been experimentally determined that to achieve a maximum leakage rate of 40 cc/minute or less at a 1 inch water column pressure, a 3.5 mil. substrate thickness $T_s$ in combination with a 10 mil. adhesive thickness $T_A$ will be suitable despite casting misregistration errors in the base 10 and cover 12 of up to 20 mils. It has been generally determined that for misregistration errors of X mils., an adhesive thickness of approximately ½ X will limit the leakage rate to the desired level.

During manufacture and assembly of the HDA, the tape seal 14 may be conveniently applied by using a roller which presses it into place in the recess between the base 10 and cover 12. This is followed by a crimping procedure which ensures adequate leak protection at the overlap position between the two ends of the single piece tape seal 14. A simple spring loaded "styler" may be employed for this purpose, for example employing a one kilogram spring force, to ensure that the proper crimping forces are applied consistently during the manufacturing and assembly process. Since the point where the two ends of the single piece tape seal 14 overlap is a potential source for some slight leakage this overlap point is preferably located at a position on the disk drive housing corresponding to a high pressure air flow to reduce the likelihood of contaminants entering at this spot.

Accordingly it will be appreciated that a very effective and easy to assemble seal is provided by the tape seal of the present invention.

In view of the foregoing it will be appreciated that the head disk assembly of the present invention provides a very compact and easy to assemble set of mechanical subassemblies for a compact disk drive. Furthermore, it will be appreciated that the individual subassemblies are accurately positioned by registration on precise mounting positions in the base plate of the head disk assembly and that the subassemblies are securely mounted therein by easy to assemble mounting mechanisms. It will further be appreciated that the magnetic latch and cantilever bean crash stop mechanisms of the present invention preserve maximal disk surface area for data storage while providing an effective limitation on the angular range of the actuator assembly.

Further features and advantages of the present invention will be appreciated by those skilled in the art. Additionally, those skilled in the art will appreciate that a wide variety of modifications may be made in the specific embodiment described above, and that such embodiment is purely for illustrative purposes. Accordingly, the scope of the present invention should be viewed as commensurate with the following claims.

What is claimed is:

1. A head disk assembly of a rotating disk data storage device, comprising:

a base;

a cover adapted to fit on top of said base so as to form a housing;

a spindle motor coupled to the base;

one or more magnetic disks attached to the spindle motor and configured within the housing, each having one or more data surfaces;

an actuator assembly including an E-block, said E-block having a generally cylindrical opening, a flexure arm provided for each data surface and coupled to the E-block, each said flexure am supporting a magnetic read/write transducer head adjacent a data surface, an electromagnetic voice coil coupled to the E-block opposite said flexure arms, a cylindrical mount post pivotally mounted to the base and extending through the opening in the E-block, and means for providing a three point mounting force between the E-block and mount post having first and second ridges in said generally cylindrical opening and means for forcing said mount post against said first and second ridges;

a voice coil magnet assembly, mounted to the base adjacent the actuator assembly, including a magnet, first and second magnetic return path members configured on opposite sides of said magnet, and a spacer for providing a space between said magnet and magnetic return path members sufficient to allow said voice coil to freely move therebetween;

a latch pin mounted on said voice coil and first and second means for restraining the angular motion of said actuator at first and second angular positions, respectively, said first means for restraining including a magnetic latch means for engaging said latch pin with a magnetic latching force.

2. A head disk assembly as set out in claim 1, wherein said E-block includes a vertical channel, extending into said generally cylindrical opening opposite said first and second ridges, and wherein said means for forcing comprises a compressible member configured within said channel and means for compressing said compressible member within said channel so as to force said member laterally into said generally cylindrical opening and force said mount post against said first and second ridges.

3. A head disk assembly as set out in claim 2, wherein said channel is generally U-shaped, with the U-shape opening into said generally cylindrical opening, wherein said E-block has a threaded opening at the bottom of said channel, and wherein said means for compressing comprises a U-shaped washer and a screw adapted to engage said threaded opening and force said U-shaped washer onto said compressible member.

4. A head disk assembly as set out in claim 1, wherein said first and second ridges comprise the intersection between first and second cylindrical bores having a first vertical axis and a second offset vertical axis, respectively.

5. A head disk assembly as set out in claim 1 further comprising:

a flex circuit, attached to said base and including a ribbon-like flex cable, and means for mounting said flex cable to the E-block, wherein said E-block includes a flex cable mounting surface and wedge-shape extension adapted to receive a portion of said flex cable and forming an oblique angle with said flex cable mounting surface and wherein said flex cable mounting means comprises an L-shaped member, adapted to receive said flex cable, and having snap-on clamps adapted to engage said E-block.

* * * * *